United States Patent
Koch et al.

(10) Patent No.: US 7,882,908 B2
(45) Date of Patent: Feb. 8, 2011

(54) DRILL

(75) Inventors: Olaf Koch, Kaufering (DE); Joachim Woerz, Landsberg (DE); Karl-Heinz Hofmann, Weil (DE); Werner Britten, Saarbruecken (DE)

(73) Assignee: Hilti Aktiengesellschaft, Schaan (LI)

( * ) Notice: Subject to any disclaimer, the term of this patent is extended or adjusted under 35 U.S.C. 154(b) by 347 days.

(21) Appl. No.: 11/149,386

(22) Filed: Jun. 9, 2005

(65) Prior Publication Data
US 2006/0032675 A1    Feb. 16, 2006

(30) Foreign Application Priority Data
Jun. 9, 2004    (DE) .................. 10 2004 028 099

(51) Int. Cl.
*E21B 10/40*    (2006.01)
*E21B 10/36*    (2006.01)

(52) U.S. Cl. .................. 175/415; 175/414; 175/419; 175/420

(58) Field of Classification Search .............. 175/389, 175/415, 430, 416, 394, 414, 420, 420.1; 408/219, 229, 226
See application file for complete search history.

(56) References Cited
U.S. PATENT DOCUMENTS

| | | | | |
|---|---|---|---|---|
| 4,116,289 A | * | 9/1978 | Feenstra | ..................... 175/430 |
| 4,549,616 A | * | 10/1985 | Rumpp et al. | ................ 175/394 |
| 4,848,489 A | * | 7/1989 | Deane | ........................ 175/429 |
| 5,350,261 A | | 9/1994 | Takaya et al. | |
| 5,553,682 A | | 9/1996 | Batliner et al. | |
| 5,947,660 A | * | 9/1999 | Karlsson et al. | ............. 408/230 |
| 6,129,162 A | | 10/2000 | Hauptmann | |
| 2002/0020566 A1 | * | 2/2002 | Hauptmann et al. | ......... 175/415 |

* cited by examiner

*Primary Examiner*—Jennifer H Gay
*Assistant Examiner*—Brad Harcourt
(74) *Attorney, Agent, or Firm*—Abelman, Frayne & Schwab

(57) ABSTRACT

A drill, which is used in a hammer drill for drilling holes in stone, concrete and the like, includes a one-piece drilling head (10, 20, 30) formed of a hard material and provided, at its first end (5), with at least one main bit having a tip (4) and at least one cutting structure (3) integral to the one-piece drilling head (10; 20; 30), and at a second end (6) located opposite the first end (5), with a bottom surface (7) for the mounting the drilling head (10; 20; 30) on the drill stem (8), and having a plurality of axially extending through-grooves (11; 21; 31) for removing drillings produced during a drilling process and having a cross-section which increases, at least regionwise, in a direction toward the bottom surface (7) of the drilling head (10; 20; 30).

4 Claims, 2 Drawing Sheets

DRILL

BACKGROUND OF THE INVENTION

1. Field of the Invention

The present invention relates to a drill, in particular, for a hammer drill for drilling in stone, concrete and the like and including a stem and a drilling head formed of a hard material and provided, at its first end with at lest one main bit having a tip, and at a second end located opposite the first end with a bottom surface for mounting the drilling head on the stem, and having a plurality of axially extending through-grooves for removing drillings produced during a drilling process.

2. Background of the Invention

In order to provide for transition of drillings, which are produced by bits during a drilling process, toward the drill helices without a flow resistance, the drilling heads are provided with through-grooves. With a drill diameter in a range from 5 mm to 17 mm, the through-grooves have, in particular in one-piece drilling heads formed of a hard material, e.g., a hard metal, a constant cross-section over the entire axial extent of the drilling head.

A drawback of the drilling heads consists in that upon formation and removal of drillings, the density is changed, which can lead to an impediment to removal of the drillings. Furthermore, with drills having a diameter in the range from 5 to 17 mm in particular, a secondary comminution beneath the bits takes place, with results in very fine drilling dust if the produced drillings are not transferred in the drill helix sufficiently rapidly. The drilling dust causes a large contamination around and outside of bore edges which is highly undesirable, in particular during works in residential areas or offices.

U.S. Pat. No. 5,893,688 discloses a drill having a drilling head with a hard metal insert and with helical grooves extending up to the free end surface of the drilling head. In this drill, an efficient removal of drillings, which are produced during a drilling process, takes place. In one-piece drilling heads formed of a hard material and having, in particular, a diameter in a range from 5 mm to 17 mm, for manufacturing reasons, helical grooves of the drill stem cannot extend up to the free end surface of the drilling head.

British patent Publication GB 2075 409A discloses a drill having a drilling head with a hard metal insert and through-grooves are tilted relative to the axial extent of the drill. In this drill, the removal of the produced drillings is improved in comparison with removal of drillings in a drill having a drilling head with axially extending through-grooves. However, in this drills, a secondary comminution still takes place which, as it has been discussed above, is highly undesirable.

Accordingly, an object of the present invention is to provide a drill having a one-piece drilling head formed of a hard material and in which the above-discussed drawbacks of the known drill are eliminated.

Another object of the present invention is to provide a drill with a one-piece drilling head formed of a hard material and in which an efficient removal of drillings is possible, with simultaneous reduction of secondary comminution.

SUMMARY OF THE INVENTION

These and other objects of the present invention, which will become apparent hereinafter, are achieved by providing drills with drilling heads in which a cross-section of the through-grooves increases, at least regionwise, in a direction toward the bottom surface of the drilling head.

The cross-section differentiation of the through-grooves reduces the flow resistance during removal of the drillings, in particular, during transition into the drill helix. In addition, a more rapid removal of drillings through the through-grooves, prevents the secondary comminution to a most possible extent. The present invention improves the drillings removal in drills even with small diameters from 5 mm and reduces the secondary comminution therein. This is because the increase of the through-groove cross-section acts analogous to a check valve for the originally comminuted drillings so that the produced drillings have a smaller ability to penetrate back under the bits. The particular form of the increase of the through-groove cross-section and, thus, of the shape of the drilling head of the inventive drill advantageously is determined by a desired drilling capacity and/or dependent on the treated component and, thus, dependent on the type and characteristics of the produced drillings. The cross-sectional increase advantageously takes place in the radial direction with respect to the axial extent of the drill and starts at the tangential limiting surfaces of respective through-grooves.

According to one of the embodiment of the present invention, the cross-sectional increase takes place additionally or exclusively in the direction of the tangential limiting surfaces of the respective through-grooves.

The cross-sectional increase is implemented, e.g., during refining of the drilling heads formed of hard metal. According to one embodiment of the invention, to this end, a non-prismatic pressing tool with different upper and lower die cross-sections is used for producing drilling head formed of a hard material, whereby a desired cross-sectional increase is produced. Alternatively, the drilling head can be formed using a metal injection-molding process during which the cross-sectional increase is produced.

In addition, the transition between the constant cross-section and the increased cross-section of the through-grooves provides a definite wear limit for the drill below which the drilling speed is significantly reduced. After the transition is worked off, the wall friction increases, and the separation of the axial blow force in two, inclined thereto, separated forces unfavorably influences the drilling. This is because the produced, by the drilling head, cone becomes more steep.

Advantageously, the tangential transition edge of the cross-section of the through-grooves is spaced from the bottom surface of the drilling head by a distance corresponding to from 10% to 40% of the distance from the tip of the drill head to the bottom surface of the drill head. A through-groove has, regionwise, a constant cross-section that extends from a free end surface of the drilling head in a direction of the bottom surface axially, and a region with an increasing cross-section that also extends in the direction of the bottom surface and that adjoins the transition edge.

According to one of the advantageous embodiments of the present invention, the cross-section of the through-grooves increases steadily, whereby a large portion of the frictional engagement provides for the check valve function of the through-grooves. The increased cross-section forms, at least regionwise, a substantially conical groove that continuously equalizes the radial difference between the base of the helical groove of the drill and the region of the corresponding through-groove with a constant cross-section. With this embodiment, very negligible turbulences in the stream of the removable drillings occur.

According to another of advantageous embodiments of the present invention, the cross-section of the through grooves increased in a wedge-shaped manner, whereby the check valve function is realized substantially by a form-locking engagement.

The through-grooves have, e.g., a first constant cross-section extending from the free end side of the drilling head and up to the tangential transition edge, and a second constant cross-section, which is greater than the first cross-section and which extends from the bottom surface of the drilling head up to the cone-shaped increase of the cross-section. The transition region, e.g., steadily changes. The axial extent of the conical cross-section increase lies advantageously in the range from 10% to 60% of the distance between the tip and the bottom surface of the drill head. This embodiment permits to eliminate turbulences in the flow of drillings in the transition region of the through-grooves between their cross-sections to a most possible extent.

According to a further of advantageous embodiments of the present invention, there is provided a stepwise increase of the cross-section of the through-grooves, whereby the check valve function of the through-grooves is provided by a large portion of the form-locking engagement. The through-grooves have, e.g., a first constant cross-section extending from the free end side of the drilling head and up to the tangential transition edge, and a second constant cross-section, which is greater than the first cross-section and which extends from the bottom surface of the drilling head up to the stepwise increase of the cross-section. The transition region is formed, e.g., as a shoulder. The axial extent of the stepwise increase of the cross-section lies advantageously within a range from the tip to the bottom surface of the drilling head, whereby turbulences in the stream of the removable drillings in the transitional region between the cross-sections of the through-grooves can be overcome.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

In the drawings, the same elements are designated with the same reference numerals.

DETAILED DESCRIPTION OF THE PREFERRED EMBODIMENTS

Figure 1:
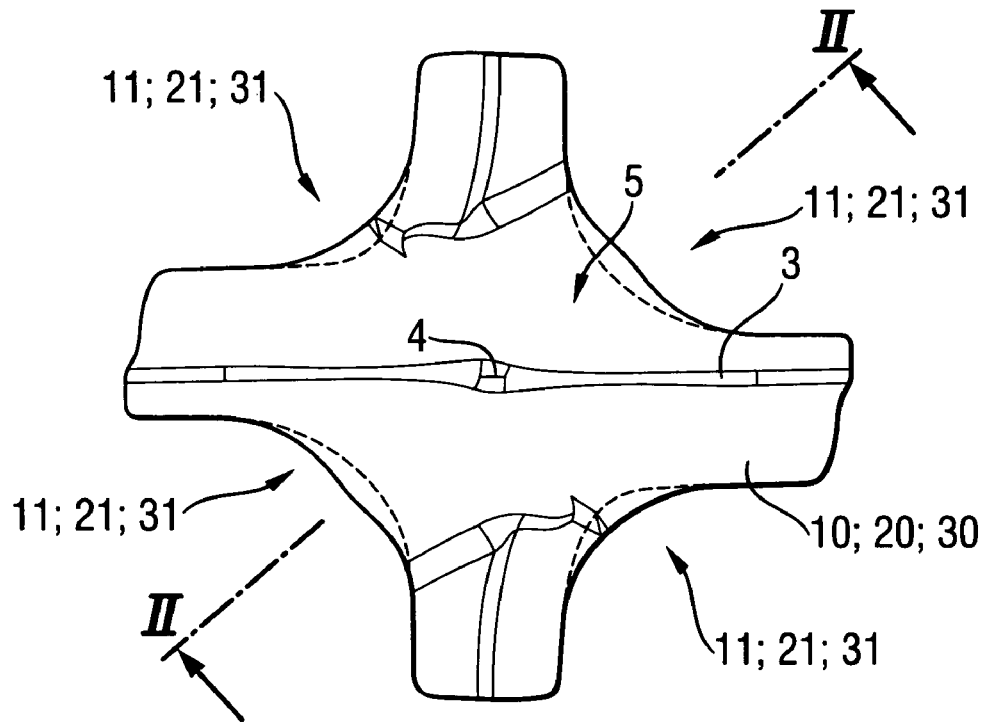
FIG. 1 a plan view of a drilling head of a drill according to the present invention.

A one-piece drilling head 10, 20, 30, which is formed of a hard metal, of a drill 1 is provided at its first end 5 with a main bit having a tip 4 and at least one cutting structure (3) integral to the one-piece drilling head 10, 20, 30. At its second end 6 located opposite the first end 5, the drilling head 10, 20, 30 has a bottom surface 7 with which the drilling head 10, 20, 30 is mounted on a drill stem 8. The drilling head 10, 20, 30 is secured on the drill stem 8 by welding or soldering. The drilling head 10, 20, 30 is provided with a plurality of vertically extending through-grooves 11, 21, 31 for removing drillings which are produced during a drilling operation.

Figure 2:
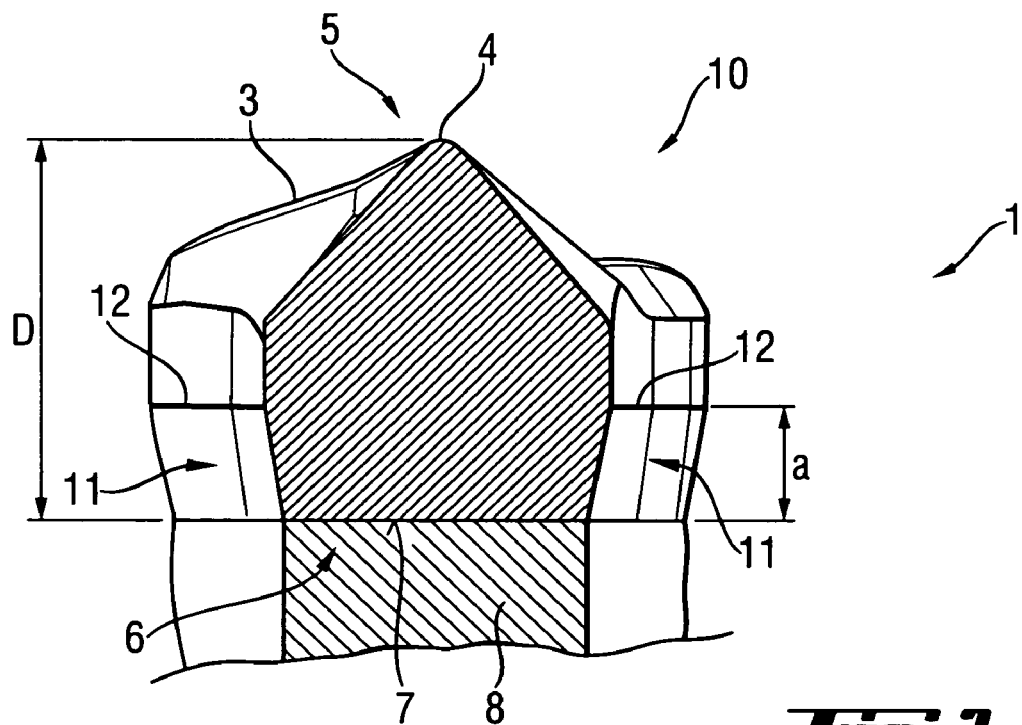
FIG. 2 a cross-sectional view along line II in FIG. 1 of a first embodiment of a drilling head according to the present invention.

In the embodiment of the drill 1 which is shown in FIG. 2, the cross-section of the through-grooves 11 steadily increased from the tangential transition edge 12 toward the bottom surface 7, so that the depth of the through-grooves 11 increases, starting from the outer circumference of the drilling head 10. The axial distance "a" between the transition edge 12 and the bottom surface 7 amounts to about 30% of the distance "D" from the tip 4 to the bottom surface 7.

Figure 3:
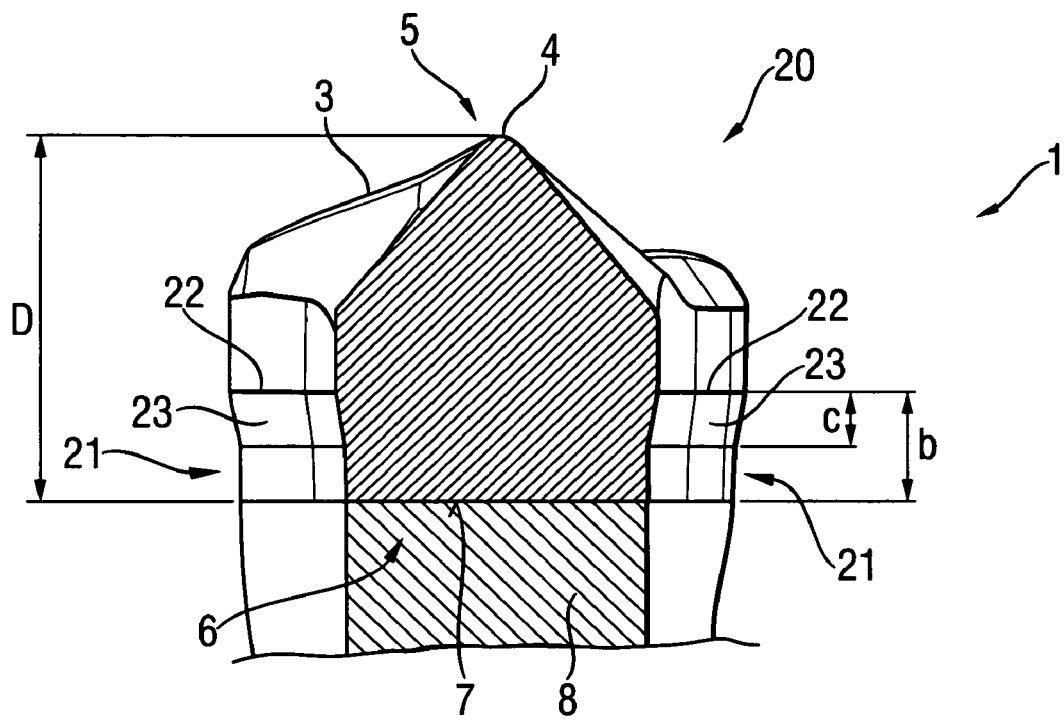
FIG. 3 a cross-sectional view along line II in FIG. 1 of a second embodiment of a drilling head according to the present invention.

In the embodiment of the drilling head 20 of the drill 1, which is shown in FIG. 3, the cross-section of the through-grooves 21 increases in such a way that it has a wedge shape adjacent to the tangential transition edge 22.

The axial distance "b" between the transition edge 22 and the bottom surface 7 amounts to about 40% of the distance "D" from the tip 4 to the bottom surface 7. The axial extent "c" of the wedge-shaped region 23 corresponds to about 20% of the distance "D" from the tip 4 to the bottom surface 7.

Figure 4:
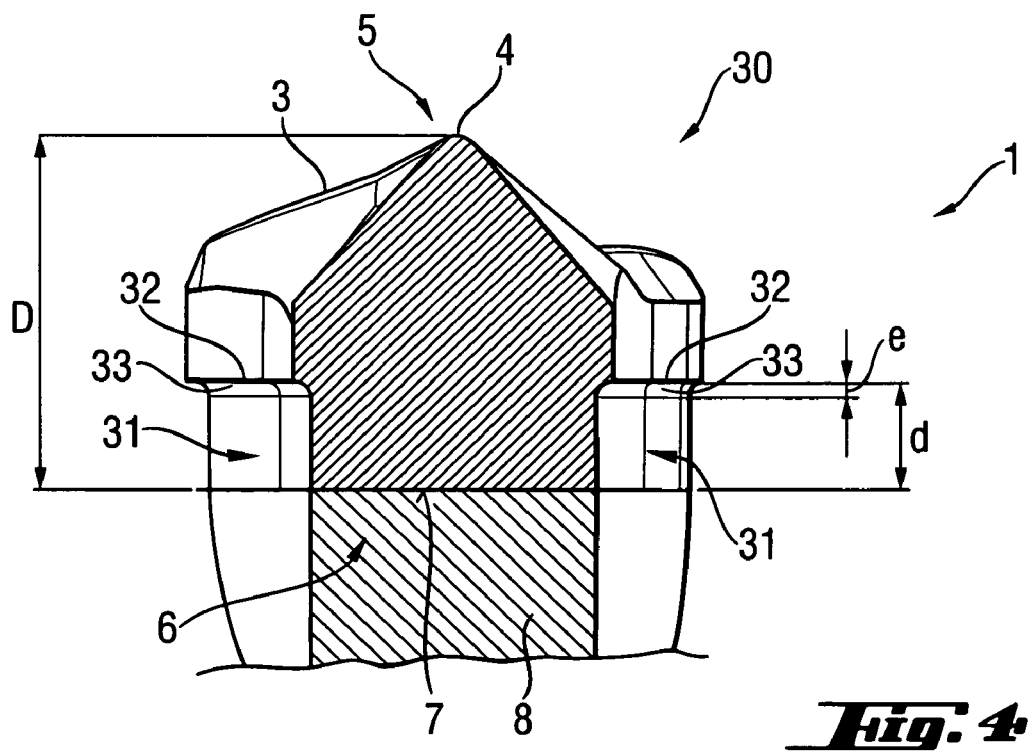
FIG. 4 a cross-sectional view along line II in FIG. 1 of a third embodiment of a drilling head according to the present invention.

In the embodiment of the drilling head 30 of the drill 1, which is shown in FIG. 4, the cross-section of the through-grooves 31 increases in such a way that it has a shoulder adjacent to the tangential transition edge 32.

The axial distance "d" between the transition edge 32 and the bottom surface 7 amounts to about 35% of the distance "D" from the tip 4 to the bottom surface 7. The axial extent "e" of the wedge-shaped region 33 corresponds to about from 1% to 10% of the distance "D" from the tip 4 to the bottom surface 7.

Though the present invention was shown and described with references to the preferred embodiments, such are merely illustrative of the present invention and are not to be construed as a limitation thereof, and various modifications of the present invention will be apparent to those skilled in the art. It is therefore, not intended that the present invention be limited to the disclosed embodiments or details thereof, and the present invention includes all variations and/or alternative embodiments within the spirit and scope of the present invention as defined by the appended claims.

What is claimed is:

1. A drill, comprising:
    a stem (8); and
    a one-piece drilling head (10; 20; 30) formed of a hard material and provided, at a first end (5) thereof, with at least one main bit having a tip (4) and at least one cutting structure (3) integral to the one-piece drilling head (10; 20; 30), and at a second end (6), located opposite the first end (5), with a bottom surface (7) for mounting the drilling head (10; 20; 30) on the stem (8), and having a plurality of axially extending through-grooves (11; 21; 31) for removing drillings produced during a drilling process and having a cross-section which increases, at least regionwise, in a direction toward the bottom surface (7) of the drilling head (10; 20; 30);
    wherein a cross-section of each of the through-grooves (11; 21; 31) has a respective tangential transition edge (12; 22; 32) spaced from the bottom surface (7) by a respective distance (a; b; d) corresponding to about from 10% to 40% of a distance (D) from the tip (4) to the bottom surface (7).

2. A drill according to claim 1, wherein a cross-section of the through-groove (11) steadily increases.

3. A drill according to claim 1, wherein a cross-section of the through-groove (21) increases in a wedge-shaped manner.

4. A drill according to claim 1, wherein a cross-section of the through-groove (31) increases stepwise.

* * * * *